US006216338B1

(12) United States Patent
Boe

(10) Patent No.: US 6,216,338 B1
(45) Date of Patent: Apr. 17, 2001

(54) HEADER PIN PRE-LOAD APPARATUS

(75) Inventor: Craig L. Boe, Nampa, ID (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/978,502

(22) Filed: Nov. 25, 1997

(51) Int. Cl.[7] .............................................. B23P 19/00

(52) U.S. Cl. ........................... 29/747; 29/825; 29/845

(58) Field of Search ........................ 29/845, 747, 739

(56) References Cited

U.S. PATENT DOCUMENTS

| | | | | |
|---|---|---|---|---|
| 3,147,779 | | 9/1964 | Brown . | |
| 3,990,768 | | 11/1976 | Faber . | |
| 4,072,390 | | 2/1978 | Fox . | |
| 4,365,398 | * | 12/1982 | Chisholm . | |
| 4,372,044 | * | 2/1983 | Chisholm | 29/747 X |
| 4,397,341 | | 8/1983 | Kent . | |
| 4,398,628 | * | 8/1983 | Chisholm | 29/845 X |
| 4,427,252 | | 1/1984 | Lee et al. . | |
| 4,476,905 | | 10/1984 | Maben . | |
| 4,503,610 | * | 3/1985 | Resch | 29/739 X |
| 4,557,539 | | 12/1985 | Zust et al. . | |
| 4,586,544 | | 5/1986 | Yagi et al. . | |
| 4,757,845 | | 7/1988 | Siwinski . | |
| 4,784,619 | | 11/1988 | Blanchet . | |
| 4,807,357 | | 2/1989 | Zahn . | |
| 4,900,276 | | 2/1990 | Doutrich . | |
| 5,098,311 | | 3/1992 | Roath et al. . | |
| 5,208,968 | * | 5/1993 | Camsell et al. | 29/747 X |
| 5,419,036 | | 5/1995 | Lane et al. . | |
| 5,427,552 | | 6/1995 | Zielinski et al. . | |
| 5,501,009 | | 3/1996 | McClure . | |

OTHER PUBLICATIONS

Western Electric Technical Digest No. 61 Jan. 1981 pp. 13–14 by G.D. Hudson et al.*

* cited by examiner

*Primary Examiner*—Carl J. Arbes
(74) *Attorney, Agent, or Firm*—Dorsey & Whitney LLP

(57) ABSTRACT

The present invention provides a pin deforming apparatus for deforming a normally straight pin for use in an electrical connection, wherein the apparatus includes a frame, a die coupled to the frame and an operating member coupled to the frame and die, whereby moving the operating member moves the die into contact with the pin sufficiently to bend at least a part of it. The invention encompasses a method of deforming a pin, as well as a method of making an electrical connection using a deformed pin.

20 Claims, 5 Drawing Sheets

HEADER PIN PRE-LOAD APPARATUS

BACKGROUND

1. Field of the Invention

The present invention relates to electrical connections and, more particularly, to an apparatus for selectively deflecting a pin for use in an electrical connection, and an electrical connection incorporating a deflected pin.

2. Description of Related Art

Making electrical connections secure and durable, i.e., resistant to mechanical uncoupling (and resultant electrical uncoupling), has been a problem for as long as electrical connections have been made. Joined plug and receptacle elements almost always seem to tend to loosen and separate when exposed to vibration, flexing, pulling, or other mechanical disturbances.

A fairly typical electrical connection with multi-pin/receptacle connectors is disclosed in U.S. Pat. No. 4,072,390 (Fox). The connector is for ribbon cable terminals and has two spaced parallel rows of conductor pins which are embedded in a block of insulating material. Each pin has a first end portion and a second end portion, the axes of which are in spaced parallel relationship, and a bent intermediate portion. The bent intermediate portion is embedded within a block of insulating material. Pin/socket connectors of the general type shown in the Fox patent have been used for a long time, and in many industries. They have proliferated in recent years with the rapid growth in the computer, video, audio and communications industries. Despite the increased friction due to the multiple pins and sockets, this type of connection still has a tendency to uncouple, particularly when the cables are long. The Fox patent makes no suggestion about how to alleviate this problem and, in particular, its bent intermediate portions do not address the problem. Further, although Fox makes a reference to dies being used to fashion pins (column 1, line 28–30), no specific pin bending apparatus or method is suggested.

There have been many attempts to make the connection between connector elements more secure. People have tried hasp-like latching connectors and screws or threaded collars that bridge between two connector components, but these are expensive, cumbersome and may interfere with easily joining the connectors. In addition, they complicate and slow disconnection because they require unlatching or unscrewing before the two connector components can be separated. Adhesives have been used to join male and female connector elements. While adhesively joined connectors may stay joined, they cannot be easily selectively disconnected once the connection is made.

As evidenced by U.S. Pat. No. 5,427,552 (Zielinski et al.) spring elements have been used to make electrical connections more secure. Zielinski et al. disclose an electrical terminal for use in automobiles where a female terminal uses a contact spring to urge an inserted male contact blade into contact with a contact floor. Spring loaded female connectors of the general type represented by the Zielinski et al. patent require a spring member, thereby increasing the complexity of a connector. The Zielinski et al. patent also discloses a method of making the subject female terminal including, with reference to FIG. 8, bending the terminal by using a die to form a socket to receive a male contact; the male contact is not bent.

Two other methods for creating a secure electrical connection are disclosed in U.S. Pat. No. 4,427,252 (Lee et al.) and U.S. Pat. No. 4,784,619 (Blanchet). The Lee et al. patent discloses an electrical connector for effecting connection to a banana-type socket, including a connector body having an axially elongated male pin extended from one end. Threaded portions, e.g., a captive, internally threaded collar at the proximate end of the pin, are provided to create a secure connection. The Blanchet electrical connection module provides security by incorporating a locking catch and locking collar arrangement.

While the above-noted patents represent advances in the art of electrical connections, there is a need for a simple, inexpensive way to provide for secure electrical connections, particularly connections formed by connectors of the general type disclosed in the Fox patent and of the type used in linking computer and other electronic equipment.

SUMMARY

In one embodiment, the present invention provides an apparatus and method for deforming a normally straight electrical pin or selected number of pins to provide for a secure electrical connection, for example the connection between a motherboard and cable end connector.

While other embodiments are certainly possible, the present invention is well-suited for connecting intelligent drive electronics ("IDE") and floppy drive cables, which may disconnect from a motherboard during shipping. The present invention can also be used in small computer system interface ("SCSI") connections for connecting scanners, hard drives and other equipment. Shipment of such equipment with connectors in place may result in the male and female connector elements becoming loose and separating. Also, after shipping and installation, the weight of longer cables can cause pulling, leading to disconnection. The security of the conventional connection between an IDE connector and headers mounted on a motherboard can vary, depending on the type of contact (e.g., dual or single beam) and contact material used, but even in the case of multi-pin dual beam contacts, there is a tendency for the cables to come uncoupled. The present invention attempts to reduce this tendency conveniently and inexpensively.

The apparatus may include a frame, a die pivotally coupled to the frame and an operating member pivotally coupled to the frame and the die, whereby moving the operating member moves the die into contact with at least one pin to deflect or bend it.

In one embodiment, the support frame is generally vertical, comprising two generally parallel support members, each having a top end and a bottom end. The die is generally flat, rectangular and solid, having two generally parallel flat side surfaces, a first, top edge, a bottom edge generally parallel to the first, top edge, and two generally parallel side edges, each of which is generally perpendicular to the top and bottom edges. The die is supported generally between the two support members, with its two side edges aligned with the support members, and is pivotally coupled to the two support members adjacent to its bottom edge.

The operating member is generally congruent with respect to the die, being generally flat, rectangular and solid. Like the die, it has a top edge, a bottom edge generally parallel to the top edge, two generally parallel side edges, each of which is generally perpendicular to the top and bottom edges, and a mid-portion. The operating member is positioned above the die, between the two support members, with its side edges generally aligned with the support members. Thus, the die and operating member are generally co-planar. The operating member is pivotally coupled to the two support members, the pivotal coupling generally at the mid-portion of the operating member and adjacent to the top end of the support members. It is also coupled to the die generally at the bottom edge of the operating member and the first or top edge of the die, whereby moving the operating member moves the die.

In one embodiment, the present invention includes an adjustable die travel stop carried by the support frame for selectively controlling the movement of the die.

One advantage of the embodiments of the present invention is that equipment/cable and other connections remain more secure during shipping and after installation, even when the cables are very long. Another advantage is that the header or motherboard is not damaged during the operations to implement the embodiments of the inventions, because the deflecting load or force is exerted substantially only on the metal pin connector. While not limited to such uses, the invention is well suited for use on single and dual beam connectors because it enhances connective security by increasing the friction generated by the deflected pin on its receptacle and, further, because it urges the female connector into tighter contact with undeflected pins. The present invention does not require expensive latching connectors on the motherboard, and use of permanent adhesive is avoided. An additional possible advantage is that the deflection in the pin connector is not in the area of single or dual beam contacts, rather, the deflection is spaced away from the base of the pin so the connector, and the connection it is used to form, tend to keep their integrity. The apparatus embodiments of the present invention (which also may be referred to synonymously as a fixture, tool, machine or the like) may be designed to be portable and to occupy a minimum amount of space. The apparatus can be used to retrofit or improve connectors on site, e.g., in the home or office, or during the manufacturing or assembly of electrical components and systems.

The preceding and other features and advantages of the present invention will become more apparent with reference to the drawings, the description of the preferred embodiments and the appended claims.

DESCRIPTION

1.0 Introduction

Figure 1:
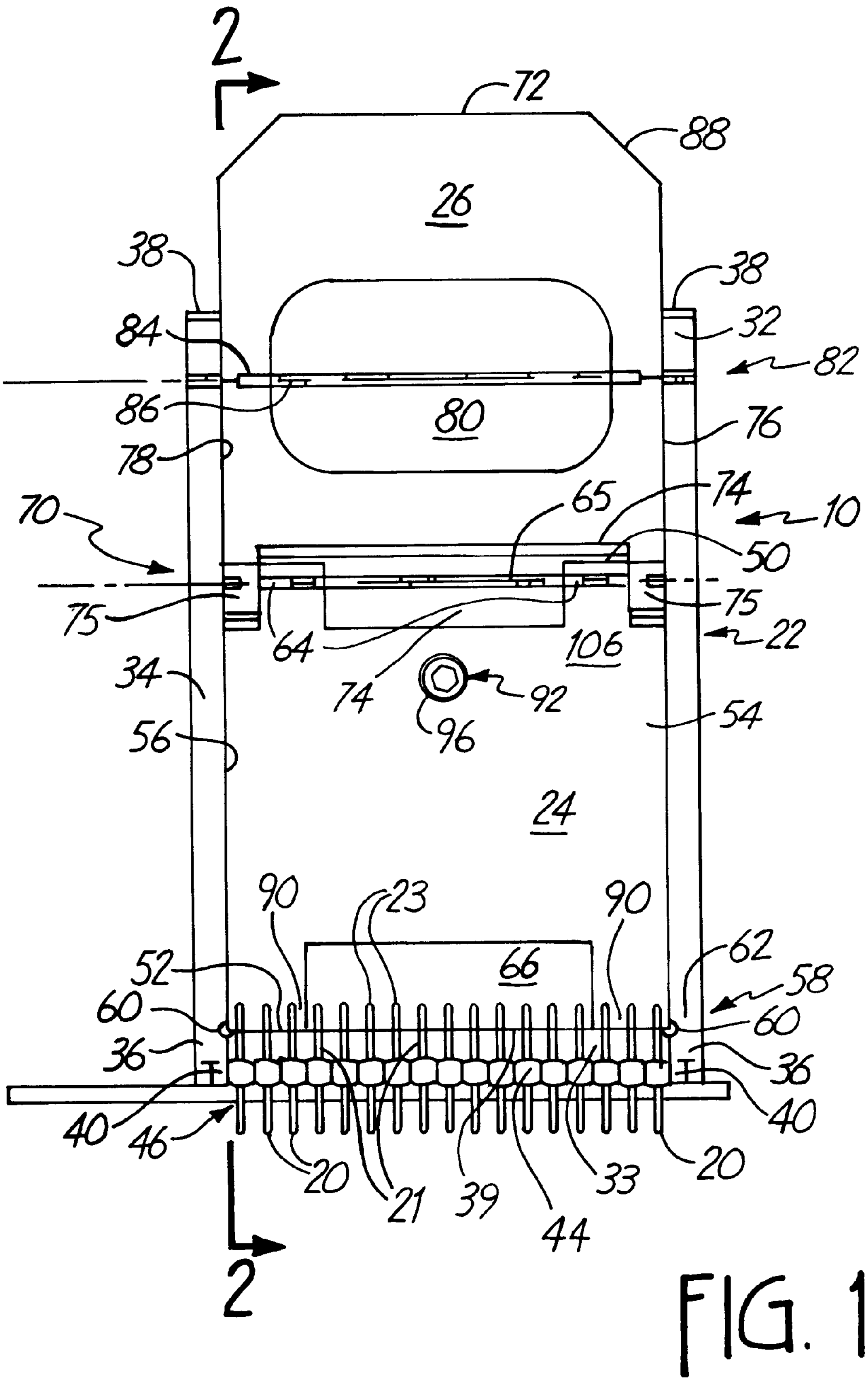
FIG. 1 is an elevational view depicting one side, the front and open side, of one embodiment of the present invention.
Figure 2:
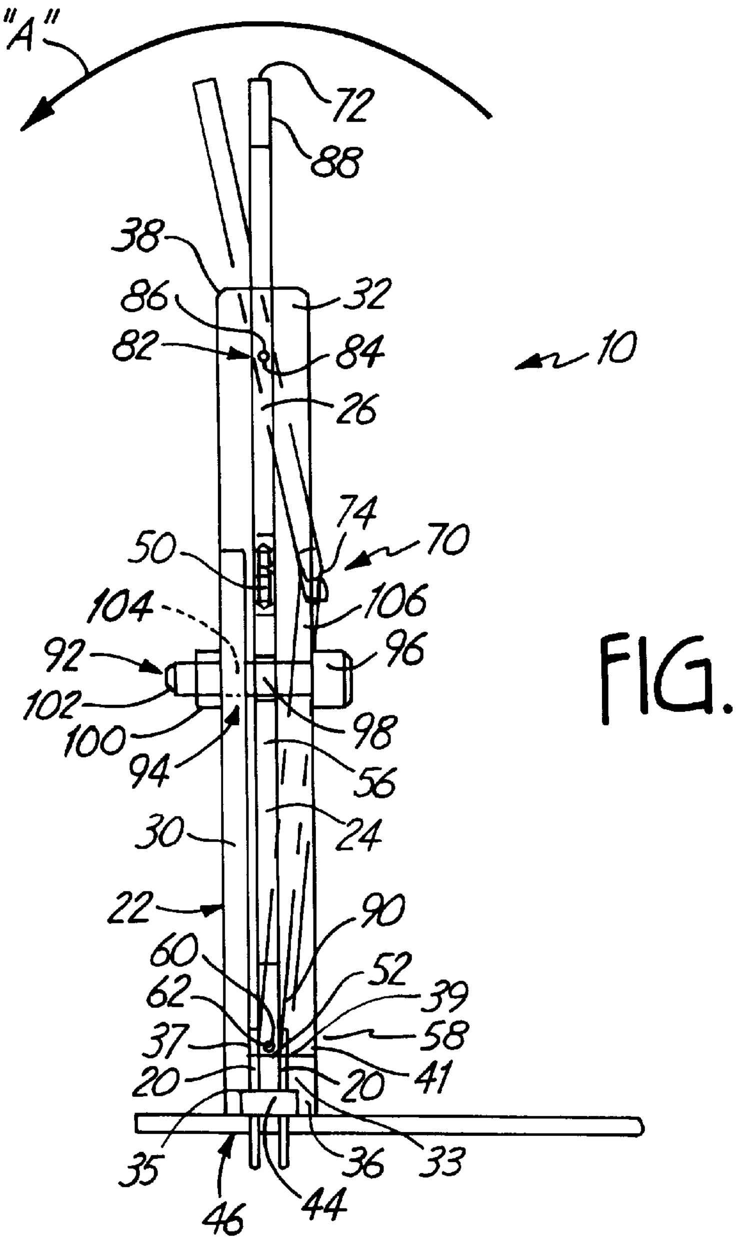
FIG. 2 is an elevational view, partially in cross-section taken along line 2—2 of FIG. 1, depicting another side of the embodiment depicted in FIG. 1.
Figure 3:
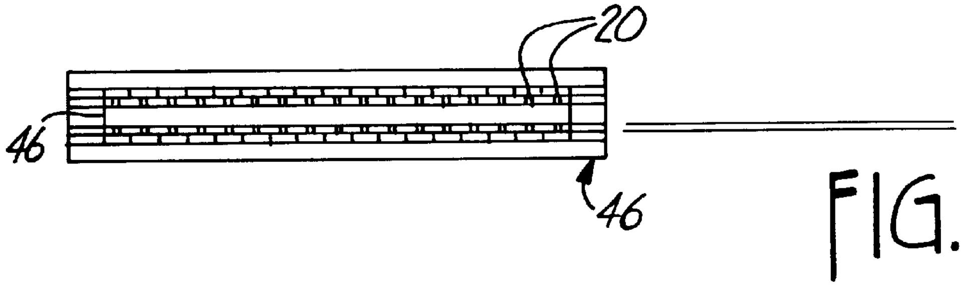
FIG. 3 depicts a workpiece, i.e., a motherboard header with pin connections.
Figure 4:
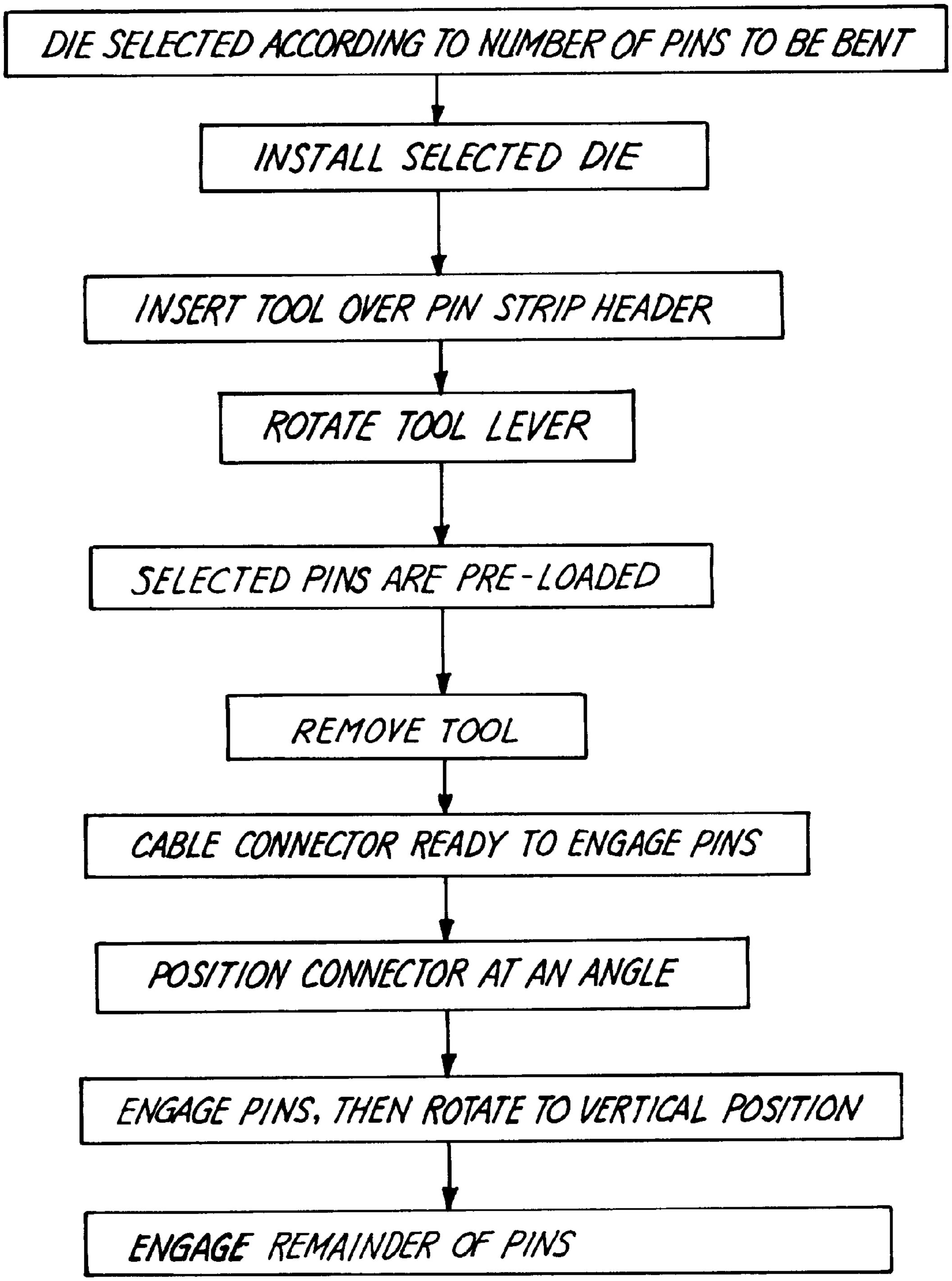
FIG. 4 diagrams one operational flow path for one embodiment of the method of the present invention.
Figures 5A, 5B, 5C, 5D:
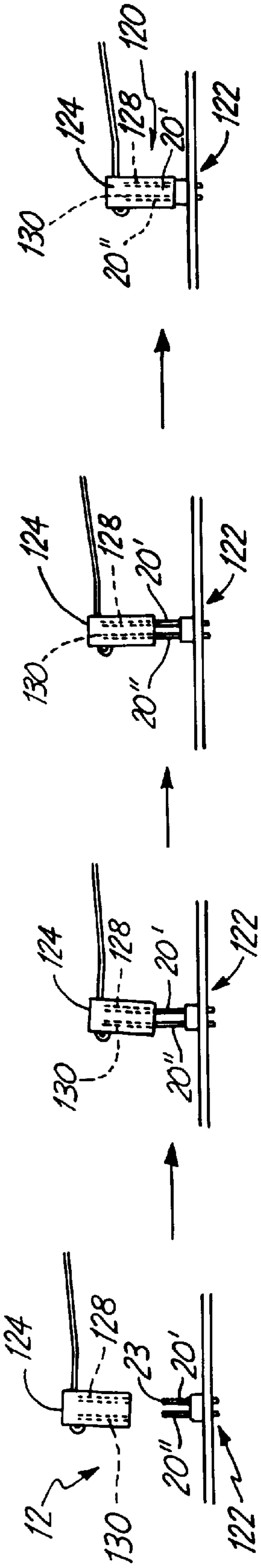
FIGS. 5*a–d* diagram making an electrical connection using a male connector element modified by the apparatus and method of one embodiment of the present invention.
Figure 6:
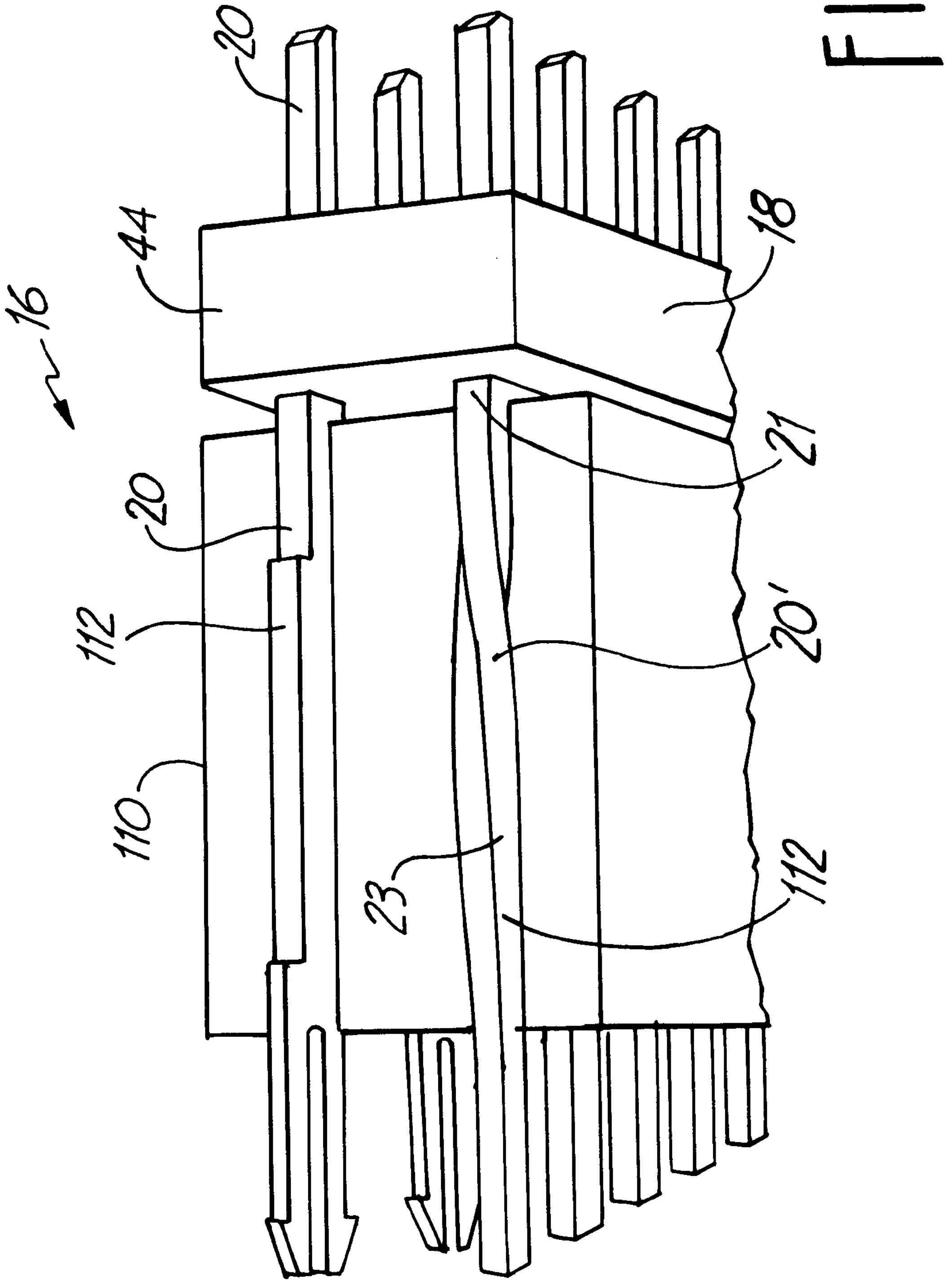
FIG. 6 depicts an electrical connection in accordance with one embodiment of the present invention.

FIGS. 1–3 depict the pin deflection apparatus 10, and features and components thereof. FIG. 4 depicts, in block diagram form, the operational flow of using the apparatus in one embodiment of the pin deflection method of the present invention. FIGS. 5*a–d* depict a method of making an electrical connection 12 using a male element 14 modified in accordance with the method described in FIG. 4. FIG. 6 depicts another electrical connection 16 made using a header element 18 modified by the method described in FIG. 4.

With regard to means for fastening, mounting, attaching or connecting the components of the pin bending apparatus 10, unless specifically described as otherwise, such means are intended to encompass conventional fasteners such as screws, complementary snaps, machined connectors, rivets, nuts and bolts, toggles, pins, and the like. Components may be joined adhesively, by means of deformation, or by sonic, chemical or high temperature welding. Conventional wires or cables of a suitable gauge, and typical electrical connection methods (e.g., splices, clamps, soldering, pins, etching, etc.), may be used to operably couple any electrical inputs, outputs and components of the present invention. Materials for making the components of the apparatus 10 are selected from appropriate materials such as metal, metallic alloys, wood, various plastics and vinyls or the like. Appropriate methods of forming the components may include casting, extruding, molding or machining.

As used herein, the term "pin" is intended to have its customary meaning, i.e., a piece of material, generally in slender elongated form, used for fastening separate articles together. In the electrical field, particularly to make an electrical connection, a body (e.g., a plug) carrying a pin or a plurality of pins may be received in a complementary female receptacle fitting or connector having a generally tubular receptacle or plurality of receptacles complementary to the pin or pins. Examples of such connective components include, but are not limited to, plugs and receptacles used in the computer industry to couple hard drives and other peripheral equipment to motherboards.

As used herein, the term "die" is intended to mean any of various tools or devices for imparting a desired shape, form or finish to a material or object, including those which produce a desired form or shape by application of pressure.

Any references herein to front and back, right and left, top and bottom, upper and lower and horizontal and vertical are intended for convenience of description only, not to limit the present invention or its components to any one positional or spatial orientation.

2.0 One Embodiment of the Apparatus

Referring to FIG. 1, the apparatus 10 for deflecting a pin or a number of pins 20 for use in an electrical connection (see, e.g., FIG. 6) comprises a frame 22, a die 24 pivotally coupled to the frame 22, and an operating member 26 pivotally coupled to both the frame 22 and the die 24, whereby moving the operating member 26 moves the die 24 into contact with a pin, or pins, 20 sufficiently to deflect or bend the pin 20 selectively slightly from its unbent, pre-deflection normal or customary straight configuration.

2.1 Frame

In one embodiment, as depicted in FIGS. 1 and/or 2, the support frame 22 is generally vertically positioned relative to the plane of a motherboard 46 that has a number of pins 20 extending perpendicularly through the motherboard plane. The frame 22 includes two upright support members 32, 34, each having a bottom end 36 and a top end 38. Referring to FIG. 2, a rear side wall 30 connects between the uprights 32, 34. The frame 22 includes a pin-receiving and supporting base 33 extending between the uprights 32, 34 at the bottom of the rear wall 30. The base 33 includes a recess 35 extending substantially for the length of the base 33 for receiving the built-up, pin carrying and supporting straight, double row header portion 44 of a motherboard 46, and a plurality of pin-receiving bores or holes 37 in a selected pattern for accommodating the pins 20 of a workpiece. In the present embodiment, two parallel, linear arrays or rows of holes 37 are provided, but any suitable array or pattern of holes 37 may be provided. The base 33 and the holes 37 substantially capture and support the motherboard 46, helping to immobilize it during operation of the apparatus 10. The base 33 also supports pins 20 which are intended to remain undeflected, and provides a fulcrum edge 39 for facilitating precise deflection of the pins 20 which are intended to be deflected. Generally, the shoulder portion 44 of the motherboard 46 lodges or fits under the base 33 in the recess 35 and between the bottom ends 36 of the uprights 32, 34. Although the recess 35 securely holds the motherboard 46 for deflection operations, each upright 32, 34 may be provided with an optional recess 40 (shown in phantom in FIG. 1) for receiving the ends of the shoulder 44 of the motherboard 46. The two recesses 40 are substantially identical, and are shaped and aligned with each other to supplement the recess 35 by accommodating and gripping the ends of the shoulder 44 of the motherboard 46.

2.2 Die

Referring to FIGS. 1 and/or 2, the die 24 is generally flat, having a first, upper edge 50, a second lower, working edge 52 generally parallel to the first edge, and two generally parallel side edges 54, 56. Each side edge 54, 56 is generally perpendicular to the first and second edges 50, 52. The die 24 is supported generally between the two uprights 32, 34, and pivotally coupled to the uprights 32, 34 generally adjacent to the second or working edge 52 of the die. The pivotal connection 58 may be effected in a variety of ways. A hinge-like connection is used in one embodiment and is formed by a bore 60 in each upright 32, 34 and in the lower edge 52 of the die 24, with a cylindrical, elongated pin 62 therethrough. At or adjacent to the first, upper edge 50, the die 24 is provided with a second bore or channel 64 which may be formed by a curled portion of the die 24 or by a generally tubular member attached at the edge 50 of the die 24.

The die 24 includes a relieved area 66 generally at the middle portion of the lower edge 52. The relieved area, specifically the length thereof along the lower edge 52, allows for a selected number of pins 20 to be deflected, because pins in the relieved area are not engaged. It should be appreciated that the relieved area 66 may be varied in size and location to accommodate fewer or more pins 20, or a selected pattern of pins 20. In particular, the relieved area 66 may comprise two separate sections, so that pins in the middle of the die 24 as well as at the ends of the die 24 are engaged.

2.3 Operating Member

The operating member 26 of the present invention is coupled to the die 24 by a hinge-like arrangement 70 with a pin 65 contained within bores 64, substantially similar to that at the lower, working edge 52 of the die 24. The operating member 26 is generally flat, and generally congruent with respect to the die 24. It has a first, upper edge 72, a second, lower edge 74 generally parallel to the first edge 72 but having two hinge tabs 75, two parallel side edges 76, 78 generally perpendicular to the first and second edges 72, 74, and a relieved central portion 80. The relieved central portion 80 is provided for receiving the hand or fingers of a user. In a fashion generally similar to the die 24, the operating member 26 is supported by and positioned generally between the uprights 32, 34. The operating member 26 is pivotally coupled between the two upright support members 32, 34, the pivotal coupling 82 being generally at the middle of the operating member 26 and adjacent to the upper, free ends 38 of the uprights 32, 34. The pinned rotatable connection 82 between the frame 22 and the operating member 26 is substantially similar to the pinned rotatable connection 58 at the lower end of the frame 22 and die 24, i.e., comprising a bore 84 and pin 86. The operating member 26 and die 24 are operably coupled along their respective lower edge 74 (with hinge tabs 75) and upper edge 50 by the hinge-like connection 70. The top corners 88 of the operating member 26 may be rounded or cut at an angle as shown in FIGS. 1 and 2.

From the preceding description of the coupling arrangement between the frame 22, the die 24 and the operating lever 26, it should be appreciated that when the operating member 26 is moved in the direction of the arrow "A" in FIG. 2, the upper portion of the die 24 moves in the opposite direction so that the operating member 26 and die 24 become non-co-planar. Because the lower working edge 52 of the die 24 is fixed relative to the frame 22, the working surface 90 of the die, a region closely adjacent to the bottom edge 52, engages the pins 20 of the motherboard 46, such as the dual beam board 46 depicted in FIG. 3. The engaged pins are then deflected, with the deflection starting at the point where the pins 20 extend above the edge 41 of the base of the frame 22.

2.4 Adjustable Stop

The adjustable stop 92 is carried on an upper region 94 of the rear side wall 30 of the frame 22 and comprises a stop head 96, a shaft 98 and a nut 100. The shaft 98 has a threaded portion 102 at the end opposite the stop head 96. When the stop 92 is mounted as shown in FIG. 2, the shaft 98 extends transversely through an aperture 104 in the rear side wall 30 of die 24. The position of the shaft 98 relative to the nut 100 (which may be fixed to the rear side wall 30) can be varied by turning it clockwise or counterclockwise to thereby limit or control the distance the upper portion 106 of the die 24 can travel. Preferably, the travel should be adjusted so that a pin 20 or a number of pins 20 can be bent at an angle of approximately 2–8 degrees. For the connection of FIGS. 5*a–d*, a bend angle of approximately 5 degrees or less is preferred.

3.0 Electrical Connection

FIG. 6 depicts a representative IDE cable end/motherboard connection incorporating a pin 20 or number of pins 20' bent by the apparatus 10 in accordance with the method of the present invention.

3.1 Female Connector

Referring to FIG. 6, the female or receptacle electrical connector 110 is typically a cable mounted end unit including an appropriate number of tubular apertures or sockets 112 generally complementary to the position and number of pin connectors 20 on the header of the motherboard 46 (shown in FIGS. 1 and 2).

3.2 Male Connector

The male connector 18 depicted in FIG. 6, e.g., a motherboard or straight dual row header, comprises a generally non-conductive insulating shoulder body 44 having a plurality of pins 20 extending therethrough. The pins 20 are in a selected arrangement and number for being mounted to the motherboard 46 and connected to the female connector 110. Each pin 20 has a base 21, a tip 23 and a pin length extending therebetween. Prior to modification by the apparatus 10 and method in accordance with the invention, typical pins 20 have a generally straight pre-deflection configuration including a normal, straight generally central longitudinal axis. The electrical connection 16 depicted in FIG. 6 incorporates at least one pin 20' bent in accordance with the present invention. The deflection or bending of the bent pin 20' is lateral, i.e., generally transverse or perpendicular to the normal longitudinal axis of the pin 20'. Referring back to FIG. 1, it should be clear from the configuration of the lower working edge 52 of the die 24 that only a selected row of pins 20 or selected pins 20 of a row will be deflected. When the bent or deflected pins 20' are inserted into the connector 110 as shown in FIG. 6, the pin tip 23 and/or a portion of the length of the pin 20' near its tip 23 contact the inside wall of the socket 112. This produces a load or force which is asymmetrical within the socket 112 and acts to resist uncoupling by increasing the friction between the bent pin 20' and receiving socket 112. There is also a spring force between the deflected and undeflected pins that is overcome when the pins 20 are inserted, but also increases frictional forces in the receiving socket 112. These pre-load forces and resulting friction help ensure that the coupling between the male and female connectors is maintained despite vibration and flexing.

4.0 In Use

With reference to FIG. 4, which depicts the operational flow or steps in one method embodiment, in using the apparatus or tool 10, a die 24 is selected, block 400, according to the number of pins 20 to be bent, i.e., by the size or shape of the relieved region 66 at the working surface 90 of the die 24. The selected die 24 is installed, block 410, in the frame 22 by aligning it with the uprights 32, 34 and pinning it in place by sliding the hinge pin 62 into the channel 60. The operating lever 26 is similarly pinned in place and may be connected to the top of the die 24. As represented at block 420, the base 33 of the tool 10 is placed over a strip header 44 as shown in FIGS. 1 and 2 with the pins to be deflected to the front of the apparatus 10 generally adjacent to and along the fulcrum edge 39. To perform pin deflection, the tool operating member 26 may be moved or rotated, block 430, as shown in FIG. 2 at arrow "A". Doing so brings the working surface 90 of the die 24 into contact with the selected pins 20 adjacent to the tip 23 of the pins 20, bending and pre-loading them, block 440. The deflection takes place at a place along the length of the pin 20, spaced away from the base 21 or tip 23. The tool 10 may be removed, block 450, and set aside, the connector then being ready to form a connection, block 460.

FIGS. 4 and FIGS. **5*a*–*d* depict the forming of an electrical connection 120 using a male connector 122 with a pin 20' (or pins, only one of which is shown) modified in accordance with the present invention. Referring to block 470 of FIG. 4 and FIG. 5*a*, the female cable connector 124 is placed above the pins (or pin set or sets) 20' and 20" (the straight or undeflected pins) of the male connector 122 at a slight angle whereby the complementary generally tubular socket (shown in phantom at 128 in FIG. 5*a*) lines up with the deflected portion of the bent pin 20'. Preferably the deflection angle will be at about 5 degrees or less from vertical (i.e., with respect to the normal or pre-deflection longitudinal axis of the pin). Referring to FIG. 4, block 480, and FIGS. 5*b* and *c*, the pin 20' is engaged and the connector 124 is then rotated to a vertical position to bring the appropriate socket 130 into alignment with the unbent pin 20." The connector 124 then can be partially, the fully engaged as shown FIG. 4, block 490 and FIGS. 5*c* and 5*d*, respectively. The bent pin 20' (or pins) produce a force tending to resist withdrawal of the receptacle 124 from the male connector 122 by contacting the inside of the tubular socket 128. Frictional force tending to resist uncoupling is also increased because the bent pin 20' tends to urge the connector 124, specifically, the inside wall of the receptacle 130, more tightly against pin 20"**.

5.0 Other Embodiments

Although the pin deflection apparatus 10 is well-suited for use on multiple pin connectors such as those commonly used in the computer industry, the pin deflection apparatus 10 could be used to modify connectors having any number of pins, and it could be useful in diverse fields, e.g., communications, manufacturing, recording, video, etc., in which a secure pin/receptacle-type connection or coupling would be desirable.

Square or round pins may be treated by the apparatus 10 in accordance with the method of the present invention. The size of the relieved area 66 (shown in FIG. 1) may be varied to bend a selected number of pins 20, thereby varying the load or force the bent pins produce in a connection. Similarly, the angle and location at which the pins 20 may be deflected or bent may be varied as long as the pins are not weakened and joining the male/female connectors is not adversely affected. The frame 22 may comprise only the two uprights 32, 34, general stability, rigidity and resistance to forces generated by operation being provided by the three transversely extending hinge pins. The rear wall 30 may be omitted, in which case the die stop 92 may be carried on a cross-member (not shown) spanning the distance between and attached to the uprights 32, 34. Also, the rear wall 30 and base 33 may be formed as a unit or may be connected to each other. The die 24 may be reconfigured by eliminating the extended pin 62, replacing it with short pins extending from the die 24 into the uprights 32, 34, then forming a slot (not shown) cut into the bottom edge 52 of the die 24. This slot (or set of slots selectively placed) receives the row or set of pins to be deflected, in which case, the pins to be deflected would be received in the die edge 52 prior to being deflected.

The generally flat rectangular operating member 26 may be shaped more like a typical lever, i.e., having two ends and a length, one of the ends being a free, handle end and the other attached to the die 24. The pivotal connections, e.g., connections 58, 82, among operational components may be made by piano type hinges, living hinges and the like. The apparatus 10 may be embodied as a hand-held, hand-operated workstation tool for use on a selected set of pins for custom board or connector designs, or it may be embodied as a pin bending portion of an automated, continuous manufacturing process.

Although a description of specific embodiments has been presented, various changes, including those mentioned above, could be made without deviating from the spirit of the present invention. It is desired, therefore, that reference be made to the appended claims rather than to the foregoing description to indicate the scope of the invention.

What is claimed is:

1. Apparatus for deflecting a pin for use in an electrical connection, comprising:

a frame;

a die pivotally coupled to the frame;

an operating member pivotally coupled to the frame and operably coupled to the die, whereby moving the operating member moves the die to plastically deform the pin said pin being mounted in an electrical connector.

2. The apparatus according to claim 1, wherein the die is generally planar.

3. The apparatus according to claim 2, wherein the operating member is generally planar, and is generally co-planar with the die.

4. The apparatus according to claim 1, wherein the die is adapted to deflect a portion of a selected plurality of pins.

5. The apparatus according to claim 4, wherein the die comprises a working surface and a relieved region adjacent to the working surface, said relieved region accommodating a number pins, whereby pins accommodated in the relieved region are not deflected.

6. The apparatus according to claim 1, wherein the frame includes a portion for accommodating a plurality of pins.

7. The apparatus according to claim 6, wherein the plurality of pins is associated with a motherboard header.

8. The apparatus according to claim 1, further comprising an adjustable stop for selectively controlling the movement of the die.

9. The apparatus according to claim 1, wherein the pin before deflection is substantially straight along a longitudinal axis and the deflected portion is deflected between 2° and 8° from that longitudinal axis.

10. The apparatus according to claim 1, wherein the pin before deflection is substantially straight along a longitudinal axis and the deflected portion is deflected substantially 5° from that longitudinal axis.

11. The apparatus according to claim 4, wherein the plurality of pins is arranged in at least one row and less than all the pins in the at least one row are deflected.

12. The apparatus according to claim 4, wherein the plurality of pins is arranged in at least two generally parallel rows and pins in only one row are deflected.

13. A pin bending apparatus for bending a pin mounted in an electrical connector for use in an electrical connection, comprising:

- a substantially planar support frame comprising two support members each having an upper end and a lower end, said lower end adapted to engage said electrical connector;
- a substantially planar die having a first edge, a second edge and two side edges, said die supported generally between the two support members, and pivotally coupled to the two support members adjacent to the second edge of the die;
- an operating member having a first edge, a second edge, two parallel side edges and a mid-portion, said operating member pivotally coupled to the two support members and to the die, whereby moving the operating member moves the die to engage and plastically deform a portion of a pin, said pin being mounted in the electrical connector; and
- an adjustable stop carried by the support frame for selectively controlling the movement of the die.

14. The pin bending apparatus according to claim 13, wherein the support frame includes a portion for accommodating a plurality of pins associated with a motherboard header.

15. The pin bending apparatus according to claim 13, wherein the second edge of the die is adapted to bend a number of pins associated with a multi-pin connector.

16. The pin bending apparatus according to claim 13, wherein the operating member is generally co-planar with the die.

17. The apparatus according to claim 13, wherein the pin before bending is substantially straight along a longitudinal axis and the bent portion is bent between 2° and 8° from that longitudinal axis.

18. The apparatus according to claim 13, wherein the pin before bending is substantially straight along a longitudinal axis and the bent portion is bent substantially 5° from that longitudinal axis.

19. The apparatus according to claim 15, wherein the number of pins is arranged in at least one row and less than all the pins in the at least one row are bent.

20. The apparatus according to claim 15, wherein the number of pins is arranged in at least two generally parallel rows and pins in only one row are bent.

* * * * *